US012026329B1

(12) United States Patent
Pan et al.

(10) Patent No.: US 12,026,329 B1
(45) Date of Patent: Jul. 2, 2024

(54) INPUT DEVICE AND MOUSE INCLUDING INPUT DEVICE

(71) Applicant: Primax Electronics Ltd., Taipei (TW)

(72) Inventors: Yung-Tai Pan, Taipei (TW); Chien-Pang Chien, Taipei (TW); Tsu-Hui Yu, Taipei (TW); Tao-Ying Chen, Taipei (TW); Chun-Che Wu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/209,390

(22) Filed: Jun. 13, 2023

(30) Foreign Application Priority Data

May 26, 2023 (TW) .................................. 112119801

(51) Int. Cl.
*G06F 3/0362* (2013.01)
*G06F 3/0354* (2013.01)
(52) U.S. Cl.
CPC ........ *G06F 3/0362* (2013.01); *G06F 3/03543* (2013.01)

(58) Field of Classification Search
CPC ............................................. G06F 3/033–0395
See application file for complete search history.

(56) References Cited

U.S. PATENT DOCUMENTS

| 2007/0132733 A1* | 6/2007 | Ram ................... G06F 3/03544 345/163 |
| 2019/0220107 A1* | 7/2019 | Odgers ................ G06F 3/0304 |
| 2020/0150778 A1* | 5/2020 | Ko ........................ G06F 3/0202 |
| 2021/0373678 A1* | 12/2021 | Chauvin ............... G06F 3/0383 |

* cited by examiner

*Primary Examiner* — Hang Lin
(74) *Attorney, Agent, or Firm* — KIRTON McCONKIE; Evan R. Witt

(57) ABSTRACT

An input device is provided, which includes a circuit board, a Hall sensor and an input module. The circuit board has a processor and a connector electrically connected to the processor, in which the connector has a plurality of connection terminals. The Hall sensor is disposed on the circuit board. The input module is configured to be assembled on or removed from the circuit board. The input module has a connecting portion, in which when the input module is assembled on the circuit board, the connecting portion touches one group of the connection terminals, and a set of signals is outputted to the processor for the processor to identify the input module. A mouse including the above-mentioned input device is also provided.

16 Claims, 4 Drawing Sheets

INPUT DEVICE AND MOUSE INCLUDING INPUT DEVICE

FIELD OF THE INVENTION

The present disclosure relates to an input device.

BACKGROUND OF THE INVENTION

At present, an electrical signal of an existing module is independent. When a structure of the module is integrated with a structure of a host, it is necessary to transmit the electrical signal of the module to the host through an additional conductive structure, resulting in an overall structure becoming complicated and increased costs.

SUMMARY OF THE INVENTION

The present disclosure provides an input device, which includes a circuit board, a Hall sensor and an input module. The circuit board has a processor and a connector electrically connected to the processor, in which the connector has a plurality of connection terminals. The Hall sensor is disposed on the circuit board. The input module is configured to be assembled on or removed from the circuit board. The input module has a connecting portion, in which when the input module is assembled on the circuit board, the connecting portion touches one group of the connection terminals, and a set of signals is outputted to the processor for the processor to identify the input module.

In some embodiments of the present disclosure, the input module is a rotating module, including: a rotating portion; a rotating shaft portion, connected to or passing through the rotating portion; and a magnet portion, connected to the rotating shaft portion or the rotating portion, in which when the rotating module is assembled on the circuit board, at least a portion of the magnet portion is adjacent to the Hall sensor, and when the rotating portion is rotated, the magnet portion is rotated with the rotating portion.

In some embodiments of the present disclosure, the rotating module further includes: a lower casing, located beneath the rotating shaft portion and/or the rotating portion, and the connecting portion is disposed beneath the lower casing.

In some embodiments of the present disclosure, the rotating module further includes: a gear portion, substantially parallel to the rotating portion, the rotating shaft portion passing through the gear portion; and at least one magnetic element, adjacent to at least one tooth root or at least one tooth top of the gear portion, in which when the rotating portion is rotated, one of the gear portion and the at least one magnetic element is rotated with the rotating portion, and the other of the gear portion and the at least one magnetic element is not rotated.

In some embodiments of the present disclosure, the input module is a turntable module, including: a turntable; a first rotating shaft, located beneath the turntable, one end of the first rotating shaft being connected to the turntable; and a magnet, connected to another end of the first rotating shaft away from the turntable, in which when the turntable module is assembled on the circuit board, the magnet is adjacent to the Hall sensor.

In some embodiments of the present disclosure, the turntable module further includes: a first lower casing, located beneath the turntable and the first rotating shaft, in which the connecting portion is a first connection pad disposed beneath the first lower casing, and the first lower casing has a first escape hole adjacent to the first connection pad, and when the turntable module is assembled on the circuit board, the first connection pad touches a first group of the connection terminals.

In some embodiments of the present disclosure, the turntable module further includes: a first gear, located beneath and substantially parallel to the turntable, the first rotating shaft passing through the first gear; and at least one first magnetic element, located beneath and connected to the turntable and adjacent to at least one tooth root or at least one tooth top of the first gear, in which when the turntable is rotated, the first gear is not rotated, and the at least one first magnetic element is rotated with the turntable.

In some embodiments of the present disclosure, the input module is a wheel module, including: a wheel having an annular groove; a second rotating shaft, passing through the wheel; and an annular magnet, disposed in the annular groove, in which when the wheel module is assembled on the circuit board, a portion of the annular magnet is adjacent to the Hall sensor.

In some embodiments of the present disclosure, the wheel module further includes: a second lower casing, located beneath the second rotating shaft, in which the connecting portion is a second connection pad disposed beneath the second lower casing, and the second lower casing has a second escape hole adjacent to the second connection pad, and when the wheel module is assembled on the circuit board, the second connection pad touches a second group of the connection terminals.

In some embodiments of the present disclosure, the wheel module further includes: a third connection pad, disposed beneath the second lower casing and separated from the second connection pad and the second escape hole by a distance, and when the wheel module is assembled on the circuit board, the third connection pad touches a third group of the connection terminals, and the third group is different from the second group.

In some embodiments of the present disclosure, the wheel module further includes: a second gear, substantially parallel to the wheel, the second rotating shaft passing through the second gear; and at least one second magnetic element adjacent to at least one tooth root or at least one tooth top of the second gear, in which when the wheel is rolled, the second gear is rolled with the wheel, and the at least one second magnetic element is not rolled.

In some embodiments of the present disclosure, the input module excludes any sensor.

The present disclosure also provides a mouse, which includes the aforementioned input device.

BRIEF DESCRIPTION OF THE DRAWINGS

Aspects of the present disclosure are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

DETAIL DESCRIPTION OF THE PREFERRED EMBODIMENT

Figure 1:
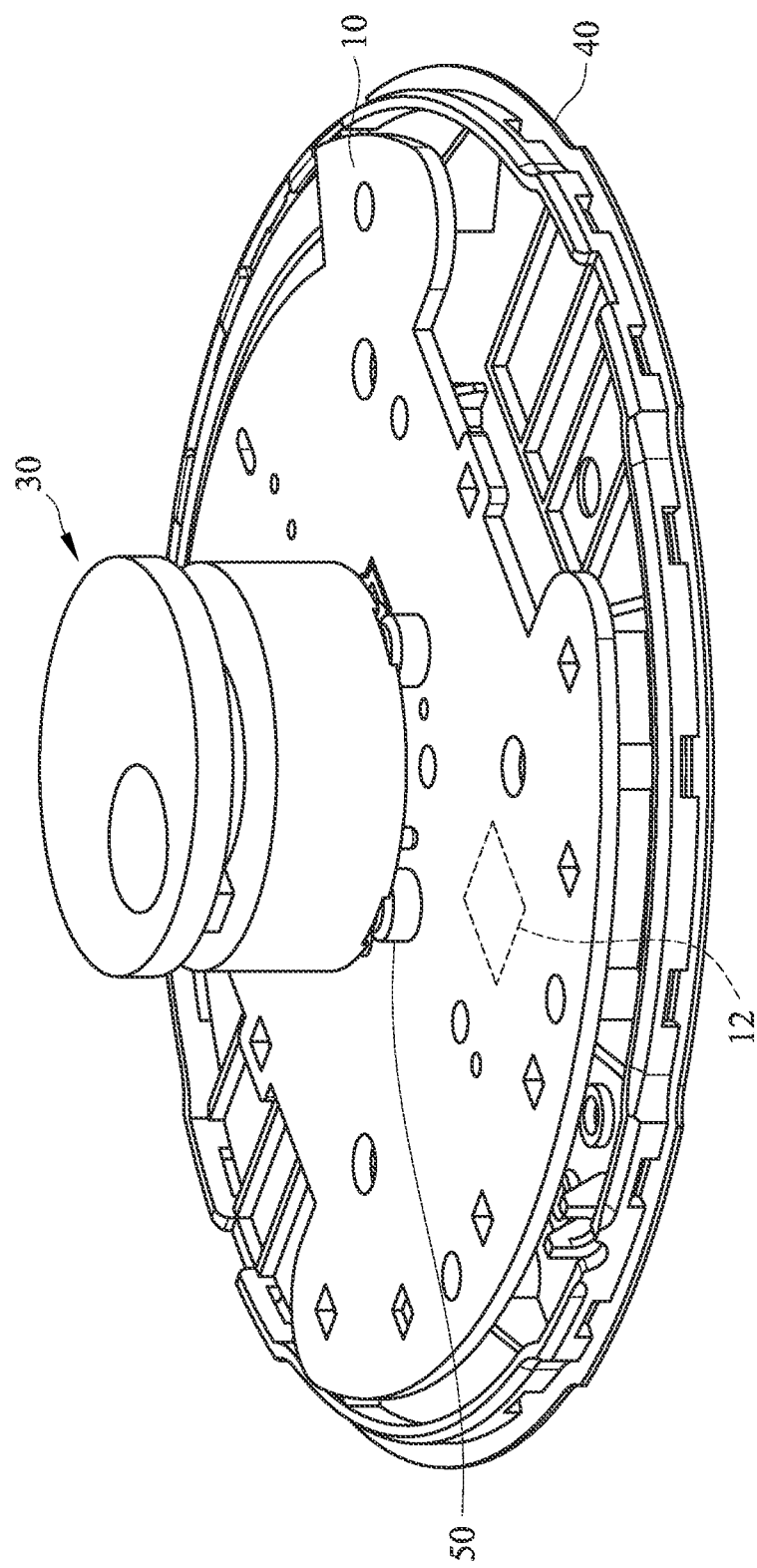
FIG. 1 is a perspective view of an input device according to an embodiment of the present invention.

The advantages and features of the present disclosure and the method for achieving the same will be described in more detail with reference to exemplary embodiments and accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180°, the relationship between the one element and the other element may change from "beneath" to "over." The spatially relative descriptions used herein should be interpreted the same.

As mentioned in background of the invention, at present, the electrical signal of the existing module is independent. When the structure of the module is integrated with the structure of the host, it is necessary to transmit the electrical signal of the module to the host through the additional conductive structure, resulting in the overall structure becoming complicated and increased costs. Accordingly, the present invention provides an input device, which includes a circuit board, a Hall sensor, and an input module. The circuit board and the Hall sensor are designed on a host side, so there is no need to transmit signals through an additional conductive structure, so that the overall structure is not too complicated and the cost is low. In addition, the input module can be replaced with another input module. The input device of the present invention may be applied to, for example, a mouse, a keyboard, a remote controller, a joystick, a game controller or other suitable electronic devices. Various embodiments of the input device of the present invention will be described in detail below.

Figure 2:
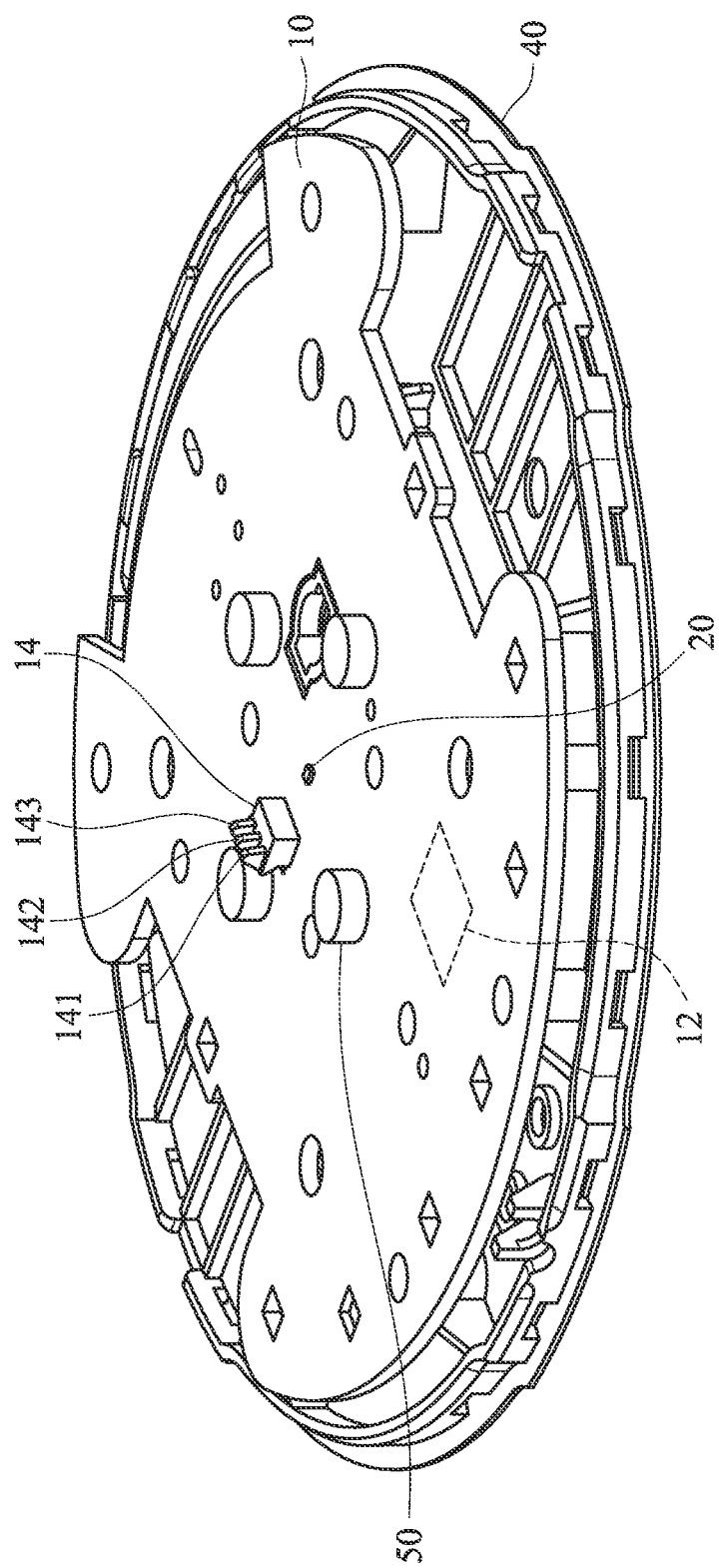
FIG. 2 is a perspective view of a circuit board, a Hall sensor and a lower cover according to an embodiment of the present invention.

FIG. 1 is a perspective view of an input device according to an embodiment of the present invention. FIG. 2 is a perspective view of a circuit board, a Hall sensor and a lower cover according to an embodiment of the present invention. Referring to FIGS. 1 and 2, the input device includes a circuit board 10, a Hall sensor 20 and an input module 30.

As shown in FIGS. 1 and 2, the circuit board 10 has a processor 12 and a connector 14. In some embodiments, the processor 12 is disposed on a lower surface of the circuit board 10, but the invention is not limited thereto. The connector 14 is electrically connected to the processor 12 and has a plurality of connection terminals (e.g., first, second and third terminals 141, 142 and 143 shown in FIG. 2).

As shown in FIG. 2, the Hall sensor 20 is disposed on the circuit board 10. In some embodiments, the Hall sensor 20 and the connector 14 are both disposed on an upper surface of the circuit board 10 and separated from each other.

As shown in FIG. 1, the input module 30 is configured to be assembled on the circuit board 10 or be removed from the circuit board 10. In some embodiments, the input module 30 excludes any sensor. In some embodiments, a top view area of the circuit board 10 is larger than a top view area of the input module 30.

In some embodiments, as shown in FIGS. 1 and 2, the input device further includes a lower cover 40 on which the circuit board 10 is disposed. In some embodiments, the circuit board 10 is in contact with the lower cover 40.

Figure 3:
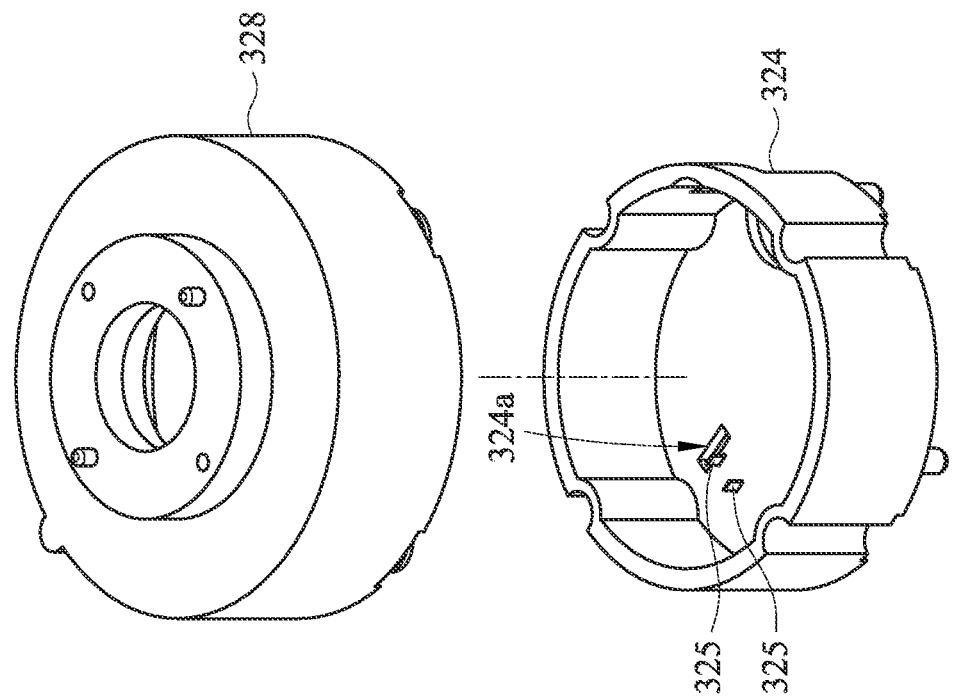
FIG. 3 is an exploded perspective view of a turntable module according to an embodiment of the present invention.
Figure 6:
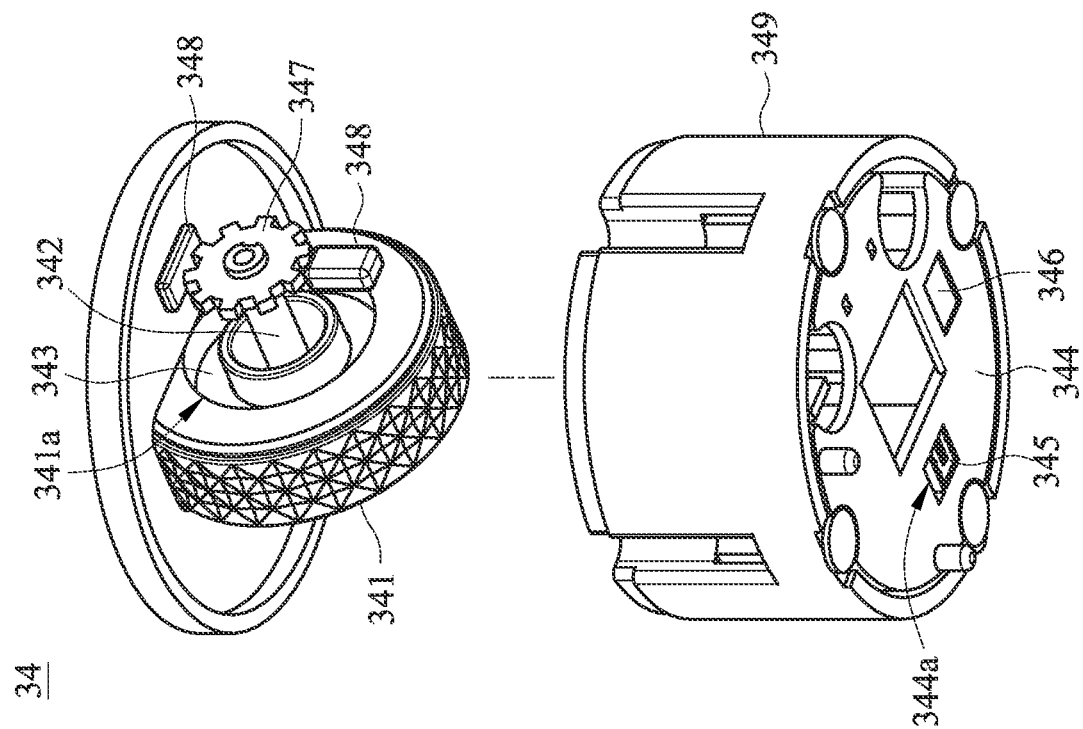
FIG. 6 is an exploded perspective view of a wheel module according to an embodiment of the present invention.

In some embodiments, as shown in FIGS. 1 and 2, the input device further includes one or more magnetic components 50 disposed on the circuit board 10, and the input module 30 includes one or more elements (e.g., screws 329 shown in FIG. 3 and screws (not marked) shown in FIG. 6) that can be attracted by the magnetic component(s) 50, so that the input module 30 can be temporarily fixed on the circuit board 10, and can also be removed from the circuit board 10. In some embodiments, the circuit board 10 has a plurality of positioning holes (not marked), and the input module 30 includes a plurality of positioning members (not marked), so that the input module 30 can be correctly assembled on the circuit board 10, and can also be removed from the circuit board 10.

The input module 30 includes a connecting portion (e.g., a first connection pad 325 shown in FIG. 3, or a second connection pad 345 or a third connection pad 346 shown in FIG. 6). As shown in FIGS. 1 and 2, when the input module 30 is assembled on the circuit board 10, the connecting portion touches one group of the connecting terminals (e.g., one or more of the first, second and third terminals 141, 142 and 143) of the connector 14, and a set of signals is outputted to the processor 12 for the processor 12 to identify the input module 30.

Figure 4:
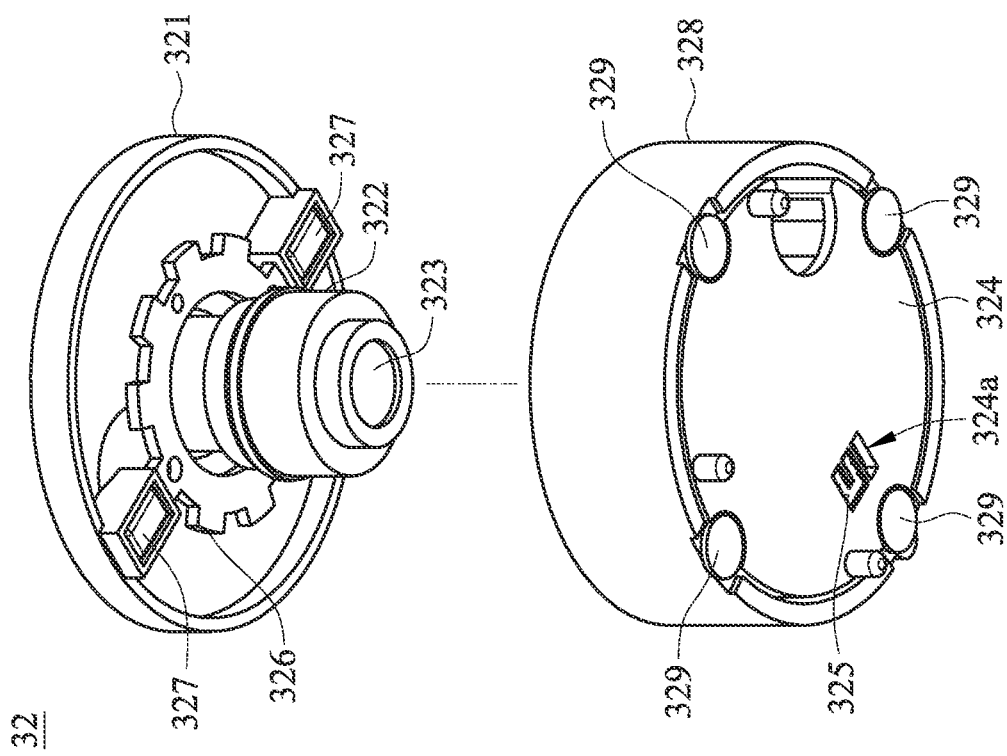
FIG. 4 is an exploded perspective view of a first lower casing and a first upper casing of a turntable module according to an embodiment of the present invention.
Figure 5:
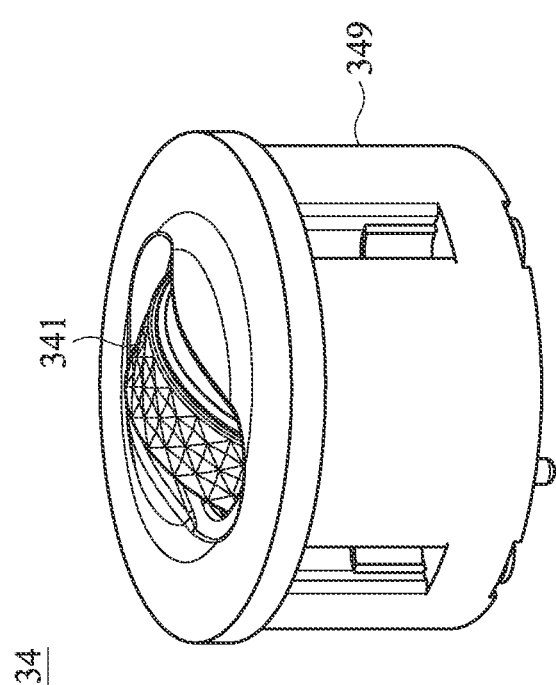
FIG. 5 is a perspective view of a wheel module according to an embodiment of the present invention.

In some embodiments, the input module 30 is a rotating module, such as a turntable module shown in FIGS. 3 to 4 or a wheel module shown in FIGS. 5 to 6, but the present invention is not limited thereto. In other embodiments, the input module is another input module that can be sensed by the Hall sensor 20.

In some embodiments, referring to FIG. 3 or FIG. 6, the rotating module includes a rotating portion (e.g., a turntable 321 shown in FIG. 3 or a wheel 341 shown in FIG. 6), a rotating shaft portion (e.g., a first rotating shaft 322 shown in FIG. 3 or a second rotating shaft 342 shown in FIG. 6) and a magnet portion (e.g., a magnet 323 shown in FIG. 3 or an annular magnet 343 shown in FIG. 6). The rotating shaft portion is connected to or passes through the rotating portion. The magnet portion is connected to the rotating shaft portion or the rotating portion. It should be noted that when the rotating module is assembled on the circuit board 10, at least a portion of the magnet portion is adjacent to the Hall sensor 20. When the rotating portion is rotated, the magnet portion is rotated with the rotating portion.

In some embodiments, referring to FIG. 3 or FIG. 6, the rotating module further includes a lower casing (e.g., a first lower casing 324 shown in FIG. 3 or a second lower casing 344 shown in FIG. 6), which is located beneath the rotating shaft portion (e.g., the first rotating shaft 322 or the second rotating shaft 342) and/or the rotating portion (e.g., the turntable 321 or the wheel 341), and the connecting portion (e.g., the first connection pad 325, the second connection pad 345 or the third connection pad 346) is disposed beneath the lower casing.

In some embodiments, referring to FIG. 3 or FIG. 6, the rotating module further includes a gear portion (e.g., a first gear 326 shown in FIG. 3 or a second gear 347 shown in FIG. 6), which is substantially parallel to the rotating portion (e.g., the turntable 321 or the wheel 341), and the rotating shaft portion (e.g., the first shaft 322 or the second shaft 342) passing through the gear portion; and at least one magnetic element (e.g., a first magnetic element 327 shown in FIG. 3 or a second magnetic element 348 shown in FIG. 6), adjacent to at least one tooth root or at least one tooth top of the gear portion. When the rotating portion is rotated, one of the gear portion and the at least one magnetic element is rotated with the rotating portion, and the other thereof is not rotated.

FIG. 3 is an exploded perspective view of a turntable module according to an embodiment of the present invention. As shown in FIG. 3, a turntable module 32 includes a turntable 321, a first rotating shaft 322 and a magnet 323. The first rotating shaft 322 is located beneath the turntable 321, and one end (e.g. an upper end) of the first rotating shaft 322 is connected to the turntable 321. The magnet 323 is connected to another end (e.g., a lower end) of the first rotating shaft 322 away from the turntable 321, for example, disposed in the other end of the first rotating shaft 322. Referring to FIGS. 1 to 3, when the turntable module 32 is assembled on the circuit board 10, the magnet 323 is adjacent to the Hall sensor 20. When the turntable 321 is rotated, the first rotating shaft 322 and the magnet 323 are rotated with the turntable 321, so that the Hall sensor 20 senses a change of a magnetic field.

In some embodiments, as shown in FIG. 3, the turntable module 32 further includes a first lower casing 324 located beneath the turntable 321 and the first rotating shaft 322. In some embodiments, the first lower casing 324 accommodates the first rotating shaft 322. The above-mentioned connecting portion is a first connection pad 325, which is disposed beneath the first lower casing 324. The first lower casing 324 has a first escape hole 324a adjacent to the first connection pad 325. Referring to FIGS. 1 to 3, when the turntable module 32 is assembled on the circuit board 10, the first connection pad 325 touches a first group of the connection terminals, for example, touching the first terminal 141 and the second terminal 142, thus, the processor 12 can identify that the input module is the turntable module 32.

FIG. 4 is an exploded perspective view of a first lower casing and a first upper casing of a turntable module according to an embodiment of the present invention. In some embodiments, as shown in FIGS. 3 and 4, the first connection pad 325 has one or more protrusions (not marked), which can pass through holes of the first lower casing 324 and can be further bent, thus, the first connection pad 325 can be fixed on a lower surface of the first lower casing 324.

In some embodiments, as shown in FIG. 3, the turntable module 32 further includes a first gear 326 and at least one first magnetic element 327. The first gear 326 is located beneath the turntable 321 and substantially parallel to the turntable 321, and the first rotating shaft 322 passes through the first gear 326. In some embodiments, as shown in FIGS. 3 and 4, the turntable module 32 further includes a first upper casing 328 disposed over the first lower casing 324, and the first gear 326 may be fixed on the first upper casing 328. The at least one first magnetic element 327 is located beneath the turntable 321 and connected to the turntable 321 and adjacent to at least one tooth root or at least one tooth top of the first gear 326. It should be noted that when the turntable 321 is rotated by the user, the first gear 326 is not rotated, and the first shaft 322 and the at least one first magnetic element 327 are rotated with the turntable 321. At this time, the first magnetic element 327 alternately adjoins the tooth root and the tooth top of the first gear 326, so the user feels sense of alternating relaxation and tension when the turntable 321 is rotated.

FIG. 5 is a perspective view of a wheel module according to an embodiment of the present invention. FIG. 6 is an exploded perspective view of a wheel module according to an embodiment of the present invention. As shown in FIGS. 5 and 6, a wheel module 34 includes a wheel 341, a second rotating shaft 342, and an annular magnet 343. The wheel 341 has an annular groove 341a. The second rotating shaft 342 passes through the wheel 341. The annular magnet 343 is disposed in the annular groove 341a. Referring to FIGS. 2, 5 and 6, when the wheel module 34 is assembled on the circuit board 10, a portion of the annular magnet 343 is adjacent to the Hall sensor 20. When the wheel 341 is rolled, the annular magnet 343 is rolled with the wheel 341, so that the Hall sensor 20 senses a change of a magnetic field.

In some embodiments, as shown in FIG. 6, the wheel module 34 further includes a second lower casing 344 located beneath the second rotating shaft 342. In some embodiments, the second lower casing 344 accommodates a portion of the wheel 341. The above-mentioned connecting portion is a second connection pad 345, which is disposed beneath the second lower casing 344. The second lower casing 344 has a second escape hole 344a adjacent to the second connection pad 345. Referring to FIGS. 2, 5 and 6, when the wheel module 34 is assembled on the circuit board 10, the second connection pad 345 touches a second group (different from the first group) of the connection terminals, for example, touching the second terminal 142 and the third terminal 143, thus, the processor 12 can identify that the input module is the wheel module 34.

In some embodiments, similar to the first connection pad 325, the second connection pad 345 has one or more protrusions (not shown), which can pass through holes (not shown) of the second lower casing 344 and can be further bent, thus, the second connection pad 345 can be fixed on a lower surface of the second lower casing 344.

In some embodiments, as shown in FIG. 6, the wheel module 34 further includes a third connection pad 346 disposed beneath the second lower casing 344 and separated from the second connection pad 345 and the second escape hole 344a by a distance. Referring to FIGS. 2, 5 and 6, when the wheel module 34 is rotated 90 degrees and assembled on the circuit board 10, the third connection pad 346 touches a third group (different from the second group and the first group) of the connection terminals, for example, touching the first terminal 141, the second terminal 142 and the third terminal 143, thus, the processor 12 can identify that the input module is the wheel module 34 rotated 90 degrees.

In some embodiments, similar to the first connection pad 325, the third connection pad 346 has one or more protrusions (not shown), which can pass through holes (not shown) of the second lower casing 344 and can be further bent, thus, the third connection pad 346 can be fixed on the lower surface of the second lower casing 344.

In some embodiments, as shown in FIG. 6, the wheel module further includes a second gear 347 and at least one second magnetic element 348. The second gear 347 is substantially parallel to the wheel 341. The second rotating shaft 342 passes through the second gear 347. The at least one second magnetic element 348 is adjacent to at least one tooth root or at least one tooth top of the second gear 347. In some embodiments, as shown in FIGS. 5 and 6, the wheel module 34 further includes a second upper casing 349 disposed over the second lower casing 344, and the at least one second magnetic element 348 may be fixed on an inner top surface of the first upper casing 349 or on an inner bottom surface of the first lower casing 344. It should be noted that when the wheel 341 is rolled by the user, the second rotating shaft 342 and the second gear 347 are rolled with the wheel 341, and the at least one second magnetic element 348 is not rolled. At this time, the tooth root and the tooth top of the second gear 347 alternately adjoin the second magnetic element 348, so the user feels sense of alternating relaxation and tension when the wheel 341 is rolled.

The present invention also provides a mouse, which includes the input device as shown in FIG. 1, but the present invention is not limited thereto. The input device of the present invention may also be applied to the keyboard, the remote controller, the joystick, the game controller or other suitable electronic devices.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not intended to limit the scope of claims of the present disclosure.

What is claimed is:

1. An input device, comprising:
   a circuit board having a processor and a connector electrically connected to the processor, wherein the connector has a plurality of connection terminals;
   a Hall sensor, disposed on the circuit board; and
   an input module, configured to be assembled on or removed from the circuit board, the input module having a connecting portion, wherein when the input module is assembled on the circuit board, the connecting portion touches one group of the connection terminals, and a set of signals is outputted to the processor for the processor to identify the input module, wherein the input module is a rotating module, comprising:
   a rotating portion;
   a rotating shaft portion, connected to or passing through the rotating portion; and
   a magnet portion, connected to the rotating shaft portion or the rotating portion, wherein when the rotating module is assembled on the circuit board, at least a portion of the magnet portion is adjacent to the Hall sensor, and when the rotating portion is rotated, the magnet portion is rotated with the rotating portion.

2. The input device of claim 1, wherein the rotating module further comprises:
   a lower casing, located beneath the rotating shaft portion and/or the rotating portion, and the connecting portion is disposed beneath the lower casing.

3. The input device of claim 1, wherein the rotating module further comprises:
   a gear portion, substantially parallel to the rotating portion, the rotating shaft portion passing through the gear portion; and
   at least one magnetic element, adjacent to at least one tooth root or at least one tooth top of the gear portion, wherein when the rotating portion is rotated, one of the gear portion and the at least one magnetic element is rotated with the rotating portion, and the other of the gear portion and the at least one magnetic element is not rotated.

4. The input device of claim 1, wherein the input module excludes any sensor.

5. A mouse, comprising the input device of claim 1.

6. An input device, comprising:
   a circuit board having a processor and a connector electrically connected to the processor, wherein the connector has a plurality of connection terminals;
   a Hall sensor, disposed on the circuit board; and
   an input module, configured to be assembled on or removed from the circuit board, the input module having a connecting portion, wherein when the input module is assembled on the circuit board, the connecting portion touches one group of the connection terminals, and a set of signals is outputted to the processor for the processor to identify the input module, wherein the input module is a turntable module, comprising:
   a turntable;
   a first rotating shaft, located beneath the turntable, one end of the first rotating shaft being connected to the turntable; and
   a magnet, connected to another end of the first rotating shaft away from the turntable, wherein when the turntable module is assembled on the circuit board, the magnet is adjacent to the Hall sensor.

7. The input device of claim 6, wherein the turntable module further comprises:
   a first lower casing, located beneath the turntable and the first rotating shaft, wherein the connecting portion is a first connection pad disposed beneath the first lower casing, and the first lower casing has a first escape hole adjacent to the first connection pad, and when the turntable module is assembled on the circuit board, the first connection pad touches a first group of the connection terminals.

8. The input device of claim 6, wherein the turntable module further comprises:
   a first gear, located beneath and substantially parallel to the turntable, the first rotating shaft passing through the first gear; and
   at least one first magnetic element, located beneath and connected to the turntable and adjacent to at least one tooth root or at least one tooth top of the first gear, wherein when the turntable is rotated, the first gear is not rotated, and the at least one first magnetic element is rotated with the turntable.

9. The input device of claim 6, wherein the input module excludes any sensor.

10. A mouse, comprising the input device of claim 6.

11. An input device, comprising:
    a circuit board having a processor and a connector electrically connected to the processor, wherein the connector has a plurality of connection terminals;
    a Hall sensor, disposed on the circuit board; and
    an input module, configured to be assembled on or removed from the circuit board, the input module having a connecting portion, wherein when the input module is assembled on the circuit board, the connecting portion touches one group of the connection terminals, and a set of signals is outputted to the processor for the processor to identify the input module, wherein the input module is a turntable module, comprising:
    a wheel having an annular groove;
    a Hall sensor, disposed on the circuit board;
    a second rotating shaft, passing through the wheel; and an annular magnet, disposed in the annular groove, wherein when the wheel module is assembled on the circuit board, a portion of the annular magnet is adjacent to the Hall sensor.

12. The input device of claim 11, wherein the wheel module further comprises:
a second lower casing, located beneath the second rotating shaft, wherein the connecting portion is a second connection pad disposed beneath the second lower casing, and the second lower casing has a second escape hole adjacent to the second connection pad, and when the wheel module is assembled on the circuit board, the second connection pad touches a second group of the connection terminals.

13. The input device of claim 12, wherein the wheel module further comprises:
a third connection pad, disposed beneath the second lower casing and separated from the second connection pad and the second escape hole by a distance, and when the wheel module is assembled on the circuit board, the third connection pad touches a third group of the connection terminals, and the third group is different from the second group.

14. The input device of claim 11, wherein the wheel module further comprises:
a second gear, substantially parallel to the wheel, the second rotating shaft passing through the second gear; and
at least one second magnetic element adjacent to at least one tooth root or at least one tooth top of the second gear, wherein when the wheel is rolled, the second gear is rolled with the wheel, and the at least one second magnetic element is not rolled.

15. The input device of claim 11, wherein the input module excludes any sensor.

16. A mouse, comprising the input device of claim 11.

* * * * *